(12) United States Patent
Goebel et al.

(10) Patent No.: US 7,066,402 B2
(45) Date of Patent: Jun. 27, 2006

(54) SPRAYING DEVICE FOR SPRAYING LIQUIDS, IN PARTICULAR, FOR SPRAYING LIQUIDS FOR AGRICULTURAL PURPOSES

(75) Inventors: Bernd Goebel, Remseck (DE); Norbert Mueller, Moessingen-Belsen (DE)

(73) Assignee: Lechler GmbH, Metzingen (DE)

( * ) Notice: Subject to any disclaimer, the term of this patent is extended or adjusted under 35 U.S.C. 154(b) by 0 days.

(21) Appl. No.: 10/474,748

(22) PCT Filed: Apr. 10, 2002

(86) PCT No.: PCT/EP02/03968

§ 371 (c)(1),
(2), (4) Date: Sep. 14, 2004

(87) PCT Pub. No.: WO02/087779

PCT Pub. Date: Nov. 7, 2002

(65) Prior Publication Data

US 2005/0017103 A1    Jan. 27, 2005

(30) Foreign Application Priority Data

Apr. 25, 2001 (EP) ................................. 01109995

(51) Int. Cl.
B05B 1/16 (2006.01)
(52) U.S. Cl. ...................... 239/170; 239/159; 239/444; 239/551; 239/67; 239/569
(58) Field of Classification Search ................ 239/159, 239/163, 170, 536, 551, 600, 394, 266, 267, 239/444, 569
See application file for complete search history.

(56) References Cited

U.S. PATENT DOCUMENTS

| 3,863,841 | A | | 2/1975 | Berthoud |
| 4,456,180 | A | | 6/1984 | Lury |
| 4,914,339 | A | * | 4/1990 | Hayman et al. ............ 312/115 |
| 5,125,578 | A | | 6/1992 | Ballu |
| 5,772,114 | A | * | 6/1998 | Hunter ........................ 239/67 |
| 6,053,427 | A | | 4/2000 | Wilger et al. |
| 6,126,088 | A | | 10/2000 | Wilger et al. |
| 6,193,166 | B1 | * | 2/2001 | Miller et al. ................. 239/76 |
| 6,196,473 | B1 | * | 3/2001 | Beeren et al. ............... 239/170 |

FOREIGN PATENT DOCUMENTS

| FR | 2 616 084 | 12/1988 |
| GB | 2 322 573 | 9/1998 |

* cited by examiner

Primary Examiner—Dinh Q. Nguyen
(74) Attorney, Agent, or Firm—Crowell & Moring LLP

(57) ABSTRACT

A Spraying assembly for spraying liquids for agricultural purposes is provided whose respective sprayer valves attached to a common liquid supply line are at least configured in the form of valve housings whose pair of valve channels share a common distributor bore. This distributor bore allows connecting the bodies of valve housings in one of two positions in order that, provided that they are connected using a t-shaped fitting, they may be arranged either with their valve bores lined up in rows extending to the front or rear of the liquid supply line, as well as ahead of or behind the liquid supply line and aligned parallel thereto. Since one embodiment also provides a rotatable pipe-T joint, the dual-sprayer-nozzle valve units may also be arranged beneath the liquid supply line, which yields a large number of opportunities for laying out the sprayer nozzles, in spite of the simple means available for connecting them.

17 Claims, 5 Drawing Sheets

SPRAYING DEVICE FOR SPRAYING LIQUIDS, IN PARTICULAR, FOR SPRAYING LIQUIDS FOR AGRICULTURAL PURPOSES

BACKGROUND AND SUMMARY OF THE INVENTION

The invention relates to a spraying device for spraying liquids, in particular, for spraying liquids for agricultural purposes, having a sprayer-bar arrangement having a liquid supply line running transverse to the direction of travel of a vehicle supporting the spraying device. Sprayer-bar fittings are spaced at intervals for attaching sprayer nozzles, each of which may be independently activated or deactivated by pneumatically or electrically controlled valves. Each of the fittings is configured in the form of a pipe-T having a distributor channel running transverse to the axis of the fittings and facilities on both of its ends for attaching the sprayer nozzles.

A spraying device of this type is known from British patent application GB 2 322 573 A, where three sprayer nozzles equipped with valves arranged in a row and along the direction of travel on a common fitting on the liquid supply line were provided in order to allow varying spraying rates by activating or deactivating one or two sprayer nozzles. This variation is also benefited by the fact that the spraying rates of each of the three sprayer nozzles arranged in a row may also be independently varied for a given supply-line pressure. The sprayer nozzles are configured in the form of oblong sprayer nozzles whose spray fans are inclined at a certain angle with respect to the longitudinal axis of the sprayer bar in order to prevent mutual overlapping of the spray fans of sprayer nozzles aligned along the direction of travel. However, the installation of such permanently attached, screw-on, sprayer nozzles requires relatively large amounts of time and effort due to the large number of sprayer nozzles involved.

An arrangement of sprayer nozzles that may also be employed for agricultural purposes, where each of the sprayer nozzles attached to the liquid supply line at intervals is controlled by a solenoid valve, is known from PCT application WO 98/18560. The sole means for adjusting spraying rate is shutting off individual valves, which gives rise to the problem that localized areas may not be uniformly covered with the medium to be sprayed.

The problem addressed by the present invention is configuring a spraying device of the aforementioned type such that it may be simply installed but, nevertheless, provides even better facilities for making adjustments in order to determine spraying rate.

In order to solve that problem, the invention involves configuring the sprayer nozzles in the form of dual-sprayer-nozzle units having a common distributor bore and a pair of mutually orthogonal coupler sleeves.

This configuration allows arranging dual-sprayer-nozzle units on the respective distributor channel of the fittings such that they can be disposed ahead of, or behind, the liquid supply line, either lined up one behind the other in the direction of travel or arrayed next to one another transverse to the direction of travel, depending upon the choice of coupler sleeve provided on their distributor bore, in a simple manner. Naturally, with this configuration the combination of a dual-sprayer-nozzle valve arranged ahead of the liquid supply line that has its individual sprayer nozzles aligned along the direction of travel and a dual-sprayer-nozzle valve arranged behind the liquid supply line that has its individual sprayer nozzles arrayed transverse to the direction of travel, or vice versa, is also feasible. This sort of configuration thus yields both simple means for making connections and has the advantage that numerous sprayer-nozzle units may be laid out, where, of course, those sprayer nozzles located ahead of, or behind, the liquid supply line may be laid out such that they have differing spraying rates. Since all sprayer nozzles are independently controllable by suitable valves, preferably pneumatically controlled valves, the total spraying rate may be adjusted to suit the particular conditions involved in a simple manner, where the large number of sprayer-nozzle units to be provided yields greater freedom in choosing their layout.

Under a further improvement on the invention, each of the fittings may be provided with a clamping fixture for clamping them onto the liquid supply line. They may then be readily installed in this manner in order that installation of the spraying device will be relatively simple, provided that the fittings on the distributor channel for accommodating the dual-sprayer-nozzle units have been configured in the form of quick-connect fittings in a manner that is well-known.

Under a further improvement on the invention, one of the coupler sleeves provided on the common distributor bore of these dual-sprayer-nozzle units may be centered between the respective axes of the pair of sprayer-valve bodies and the other arranged on a free end of the distributor bore such that the dual-sprayer-nozzle units, along with their sprayer nozzles, may be aligned either parallel to, or transverse to, the direction of travel, as mentioned above, without any special preparations for their installation being required.

Under a further improvement on the invention, it may be provided that the distributor channel of the interconnecting fittings is incorporated into a separate manifold having a central fitting mating to the coupler. This configuration will then allow arranging the interconnecting fittings such that they may be rotated about the coupler, preferably through 90°, in order that the dual-sprayer-nozzle units may be arranged either ahead of and behind the liquid supply line, or beneath the liquid supply line if the distributor channel leading from the coupler to the pair of dual-sprayer valve bodies is routed parallel to, and beneath, the liquid supply line. Of course, in the latter case, due attention will have to be devoted to providing that the valves and dual-sprayer-nozzle units connected to the distributor channel and the swept areas of the latter's rotational motions also lie beneath the liquid supply line, which, however, may be achieved simply by employing a coupler having a suitable length.

Under a further improvement on the invention, the coupler and the fittings mating to the interconnecting fittings are all configured in the form of quick-connect fittings having two latching positions separated by 90°. This configuration allows both simple, rapid, installation and rapidly replacing individual sprayer-nozzle units whenever required.

The valves for controlling the sprayer nozzles may be equipped with spring-loaded, pneumatically actuatable, roller-diaphragm or piston-ring switching devices.

Under a further improvement on the invention, valve plates may be provided with peripheral sealing lips riding on elastic O-ring seals that yield tightly sealed valves and thus prevent undesirable post-spraying drippage from the spraying device in a simple manner. The bodies of the sprayer nozzles may then be installed using union nuts in a well-known manner, where the valve bodies are to be provided with mating threads. An arrangement employing bayonet-lock fittings is also feasible, provided that the components involved have been suitably configured.

BRIEF DESCRIPTION OF THE DRAWINGS

The invention is depicted in the figures, based on sample embodiments thereof, and will be explained below.

DETAILED DESCRIPTION OF THE DRAWINGS

Figure 1:
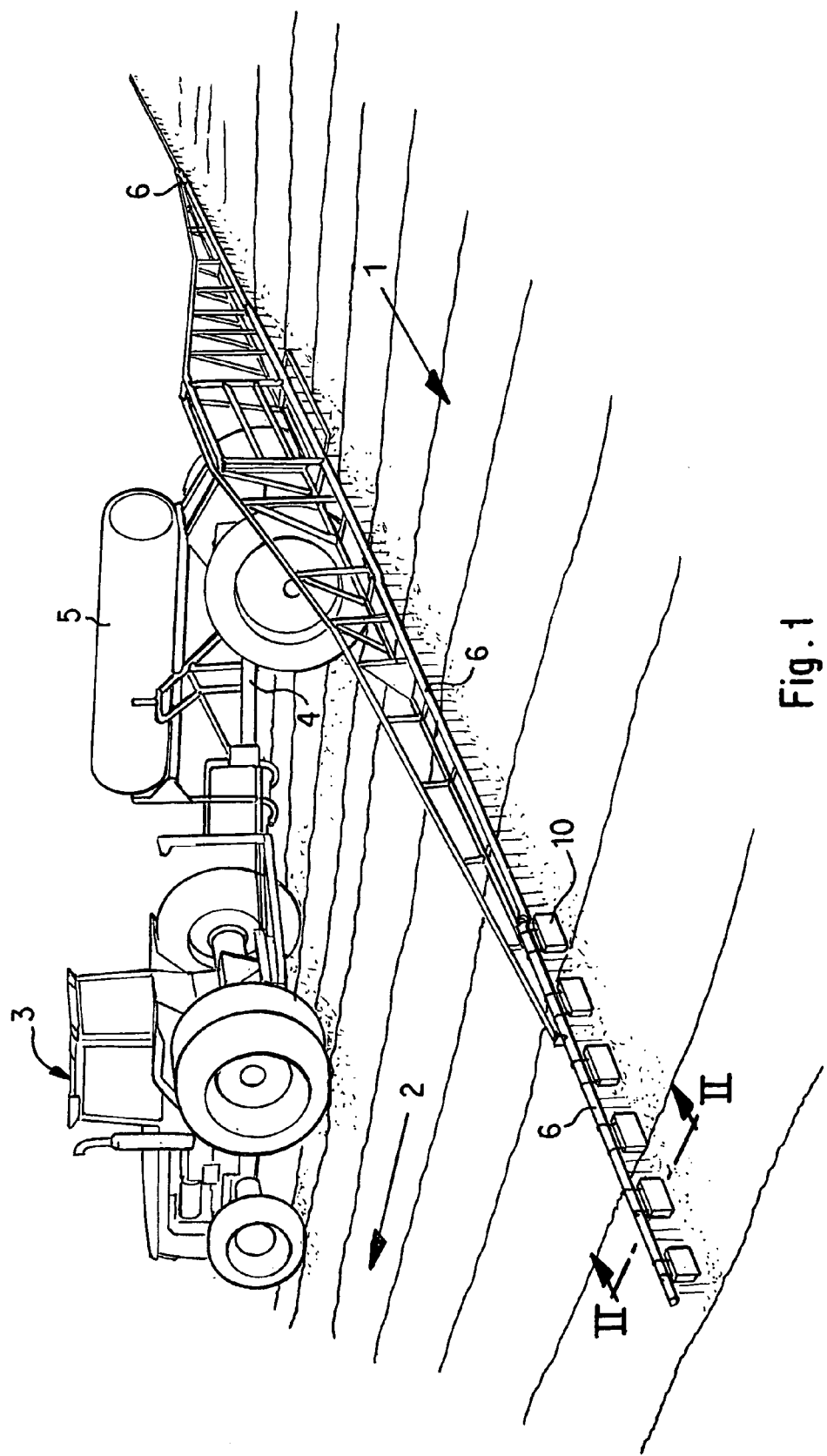
FIG. 1 a schematized perspective view of a spraying device according to the invention whose sprayer bar is mounted on a trailer that is equipped with a tank and towed by a tractor.

FIG. 1 depicts a spraying device 1 according to the invention in use. In the case of the sample embodiment shown, the spraying device 1 comprises a sprayer bar, which has not been depicted in detail, mounted on a trailer 4, which is also termed a "sprayer trailer," on which a tank 5 for holding the liquid to be sprayed is mounted, hitched to a tractor 3, where the sprayer bar is oriented transverse to the direction of travel 2 of the tractor 3. The spraying device comprises several sections of a liquid supply line 6 held in place on the rear end of the trailer 4 by the sprayer bar, which has not been depicted in detail, where the individual sections thereof are configured in a well-known manner such that they, together with their respective associated sections of the sprayer bar, may be swung inward in order to reduce the vehicle's width when the vehicle is transported on public roads.

Every section of the liquid supply line 6, which is supplied with the liquid to be sprayed contained in the tank 5 by a pump in a manner that has not been shown in detail, is provided with several fittings spaced at intervals for connecting valve bodies 10, each of which has two or more sprayer nozzles assigned to it, as will be described below.

Figure 2:
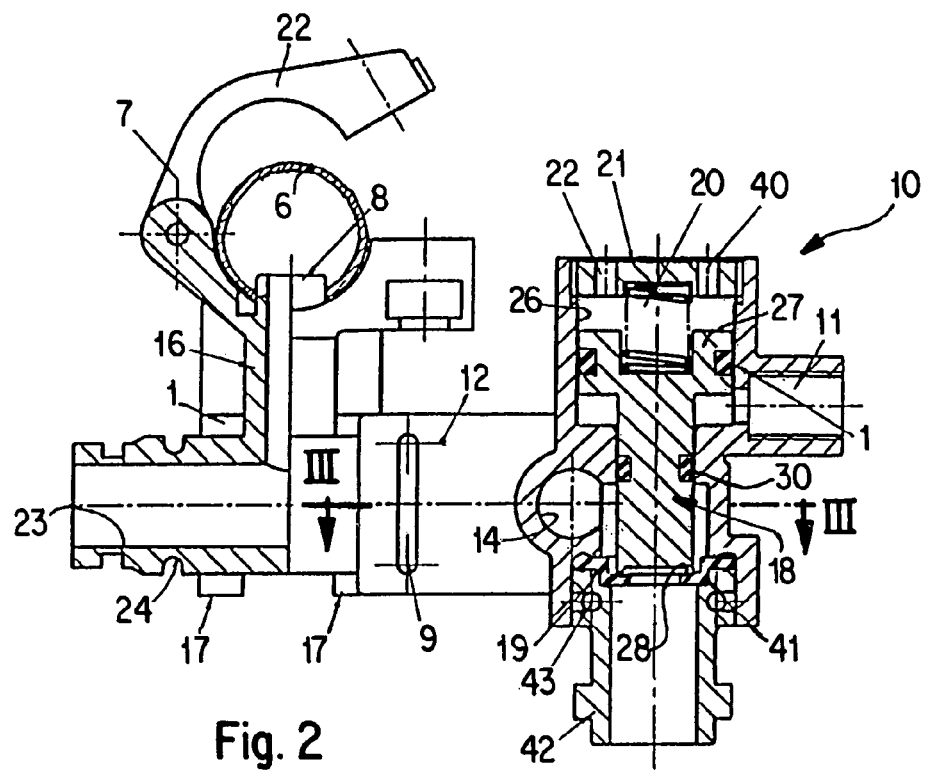
FIG. 2 an enlarged view of a section through one of the interconnecting fittings on the sprayer bar shown in FIG. 1.

From FIG. 2, it may be seen that each of the fittings 16, which are attached to the liquid supply line 6 by a clamping fixture 7 having a pivoted clamping bail 22, is connected to one of the corresponding openings in the liquid supply line 6 via a nipple 8. These nipples 8 have a slit on each of their sides in order to provide for a full drainage of the liquid supply line 6.

Each of the fittings 16 is provided with a distributor channel 23 running transverse to its axis that is open on both ends, each of which has facilities for sliding on a coupler sleeve 12 of the valve body 10, which may then be rigidly attached to the distributor channel 23 via a connector 9 that engages the groove 24. Positioning aids and anti-rotation dogs in the form of small protrusions 17 are arranged on each of the distributor channels 23 in order to prevent the coupler sleeves 12 from rotating.

The valve body 10 is configured in the form of a duplex valve body having a pair of valve bores 25, each of which is equipped with a valve plunger 18, where the upper end of each bore 25 merges into another bore 26 having a larger diameter and a piston-shaped collar 27 on the valve plunger 18 is acted upon by a switching spring 20 that acts as a compression spring. The upper end of the bore 26 is sealed by a plug 21 that is provided with ventilating ports 40. A fitting 11 for attaching the aforementioned pneumatic control line opens out into the space beneath the piston 27. When pneumatic pressure is applied, the valve plunger 18 will thus be raised and lift its circular lip 28 off the circular rim 42 of an elastic O-ring seated on a stepped shoulder 19 situated between the valve body 10 and a nozzle mount inserted into the valve body 10 from below that has a bayonet-lock cap. This nozzle mount 42 is also latched into position on the valve body 10 by a connector 43 whose construction is identical to that of the connector 9 mentioned further above.

The valve body 10 also has a common distributor bore 14 for both valve bores 25 that is connected to the sealing seat between the lip 28 and the O-ring seal rim 41. This distributor bore 14 is provided with a pair of openings, one of which has a coupler sleeve 12a for inserting a quick-connect fitting, and the other of which has the aforementioned coupler sleeve 12. The coupler sleeve 12a is coaxial with the axis of the common distributor bore 14. However, the axis of the coupler sleeve 12 is orthogonal to the axis of the distributor bore 14 and centered between the bores 25 in the valve body. In the case of the sample embodiment shown, the coupler sleeve 12a is sealed by a blanking plug 13 that has the same outer dimensions as the ends of the distributor channel 23 and is thus inserted into the coupler sleeve 12a in the same manner in which the coupler sleeve 12 is inserted into the distributor channel 23. It should be noted that, due to this configuration, the valve body 10 could also be connected to its interconnecting bore 14 via the coupler sleeve 12a on the distributor channel 23, which would then result in a ready-to-install version like that shown in FIG. 5. The ready-to-install version shown in FIG. 2, i.e., the version in which the valve body 10 is connected to the distributor channel 23 via its coupler sleeve 12, yields an embodiment like that shown in FIG. 4.

Figure 3:
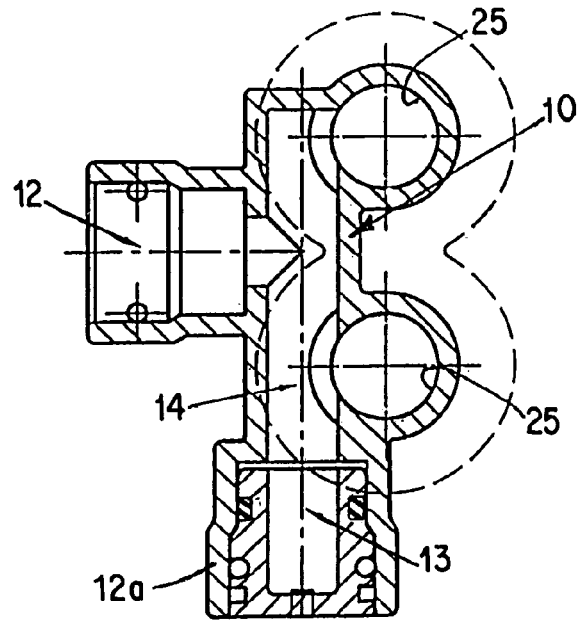
FIG. 3 a section through the dual sprayer nozzle shown in FIG. 2, taken along section line III.
Figure 4:
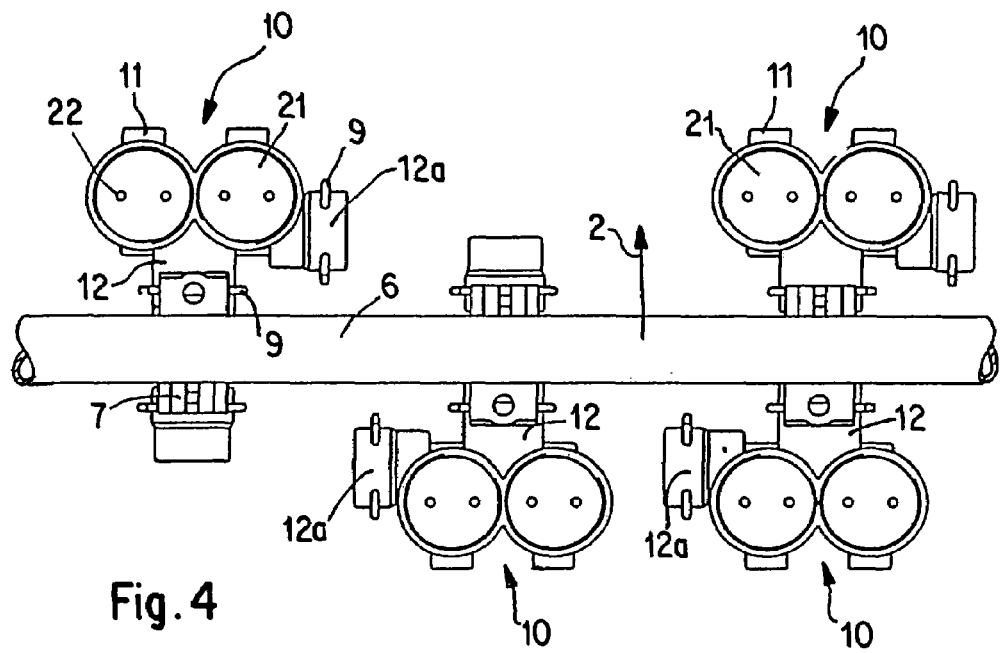
FIG. 4 an enlarged portion of a top view of the liquid supply line, complete with the dual-sprayer-nozzle units arranged thereon, which are shown here in a first embodiment thereof.

From FIG. 4, it may be seen that each of the four dual-sprayer-nozzle valve bodies 10 shown there is connected to the distributor channel 23 via its coupler sleeve 12 in order that its pair of bores 25 and the associated valves and sprayer nozzles will lie along the direction of travel 2 and ahead of the liquid supply line 6, with each situated at the same distance therefrom, where the coupler sleeve 12a is sealed by a blanking plug, as indicated in FIG. 3.

Figure 5:
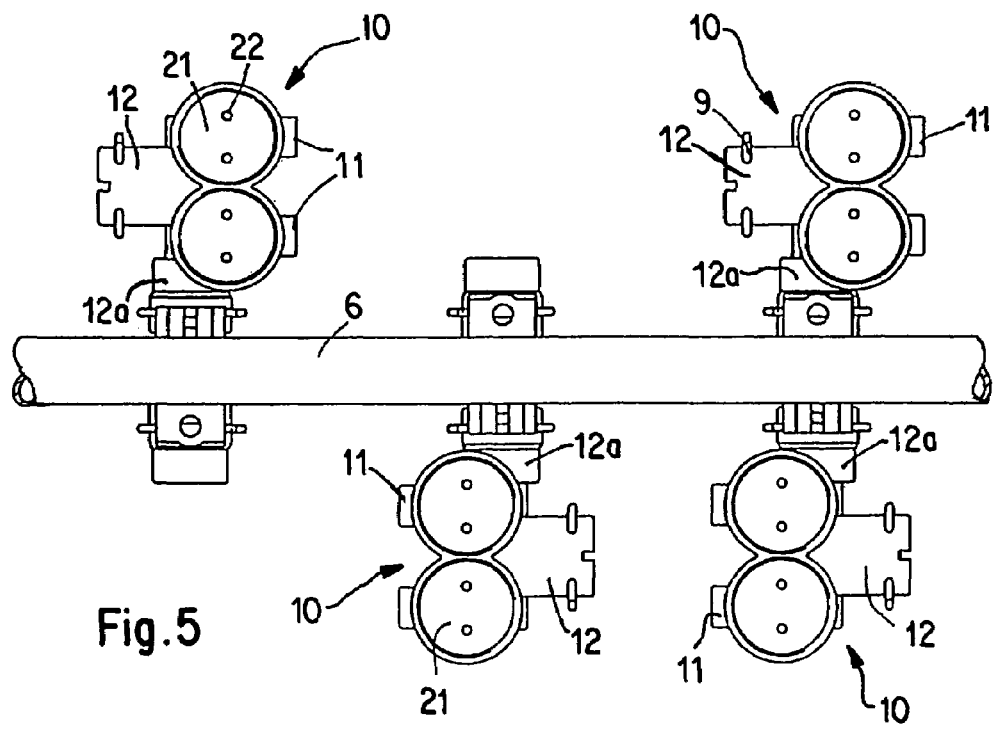
FIG. 5 a top view, similar to FIG. 4, of a second version of the liquid supply line shown in FIG. 1.

In FIG. 5, on the other hand, each of the dual-spray-nozzle valve bodies 10 is now connected to distributor channel 23 via their coupler sleeve 12a, and the coupler sleeve 12 is sealed by a blanking plug. These valves are thus connected up in rows, with their valve bores 25 and aligned along the direction of travel 2. As indicated in FIG. 5, they may be arranged either ahead of or behind the liquid supply line 6 or on both sides of the liquid supply line, which, of course, also applies to the embodiment shown in FIG. 4. These installation options yield various opportunities for connecting up various arrangements of sprayer nozzles in an exceedingly simple manner. Of course, sprayer nozzles, each of which has a different spraying rate, may also be arranged in this manner, if desired. However, if the arrangement shown is employed and all sprayer nozzles have been configured to have the same spraying rate, but differing spraying characteristics, e.g., differing droplet sizes, it will, at least in the case of the arrangement shown at the extreme right of FIG. 4 or FIG. 5, also be possible to spray at locally varying rates using a single arrangement by activating either just one of the sprayer nozzles, or two, three, or even four of the sprayer nozzles, via their respective associated compressed-air fittings 11. Employing nozzles that have been configured for differing spraying rates will allow covering a broader range of spraying rates if the sprayer nozzles involved are operated either alone or in arbitrary combinations.

Figure 6:
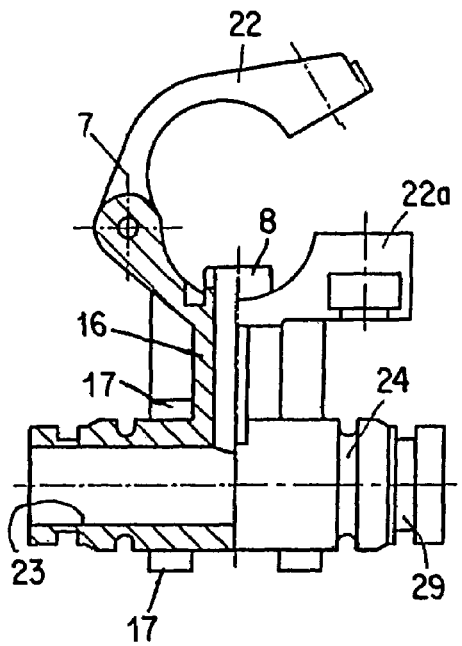
FIG. 6 a representation of the t-shaped fitting shown in FIG. 2.
Figure 7:
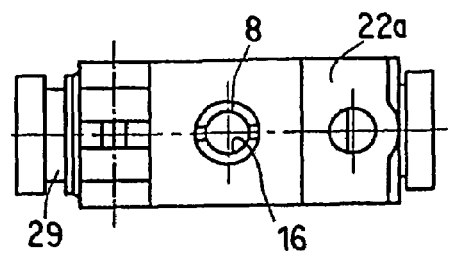
FIG. 7 a top view of the t-shaped fitting shown in FIG. 6.

FIGS. 6 and 7, depict, once again, the configuration of the fitting 16, shown here alone, the various means for its installation, and the configuration of the ends of distributor channel 23, onto which the coupler sleeves 12 or 12a may be inserted. Here again, it may readily be seen that the outer surfaces of both open ends of the distributor channel 23 are provided with the aforementioned groove 24 for securing the sleeve via the connector 9, as well as another groove 29 for accommodating an O-ring seal that is not shown in detail. In the closed position, the clamping bail 22, which is not shown in FIG. 7, may be rigidly secured to its mating component 22a in a well-known manner.

Figure 8:
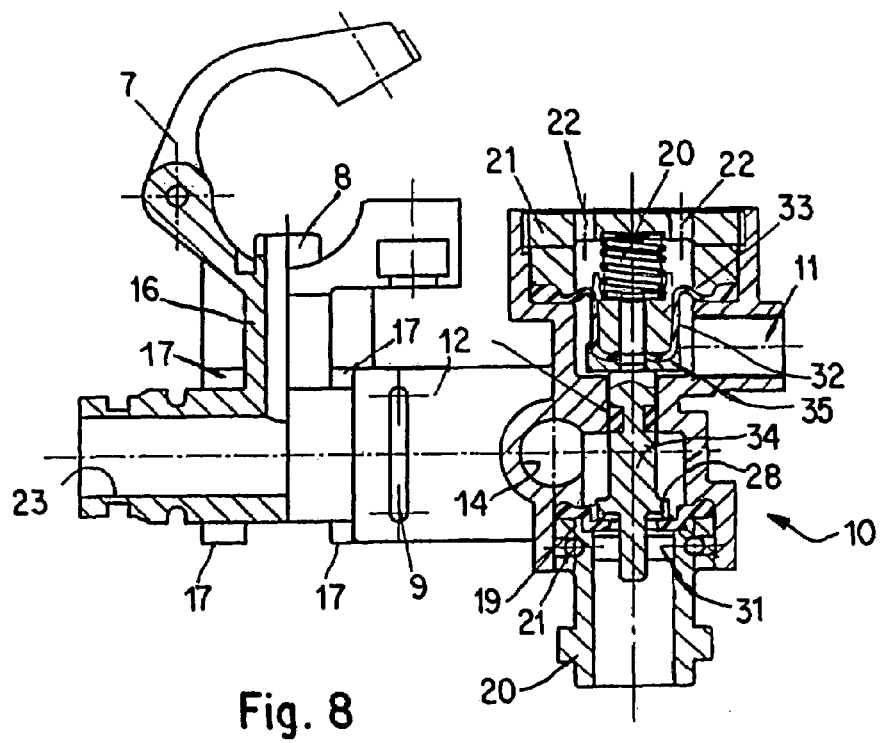
FIG. 8 an illustration of an interconnecting fitting on the sprayer bar that is similar to that shown in FIG. 2, but equipped with a valve unit that may be pneumatically controlled via a roller membrane.

FIG. 8 depicts a variation on the invention in that, in this particular case, the valve bodies 10 incorporate valves equipped with a roller diaphragm 32 for controlling the spray-nozzle inserts, which are not shown here. In this case, a valve plunger 34 that has a threaded extension on its upper end onto which a dished mounting plate 35 for holding the roller diaphragm 32 and an insert 33 for retaining the roller diaphragm are screwed is provided. The insert 33 is, in turn, forced downward and up against the roller diaphragm by the action of the compression spring 20, which, in the case of the sample embodiment shown in FIG. 2, is held in place by the cap 21 on the valve body 10. The valve plunger 34 has an extension on its bottom end that is held in place by a star-shaped guide 31. The radial projections of that guide have knife-edged contacting surfaces in order to minimize friction and prevent blockages. Otherwise, the valve body 10 is configured in the same way as that shown in FIG. 2. Valves equipped with roller diaphragms may also be beneficially employed.

Figure 9:
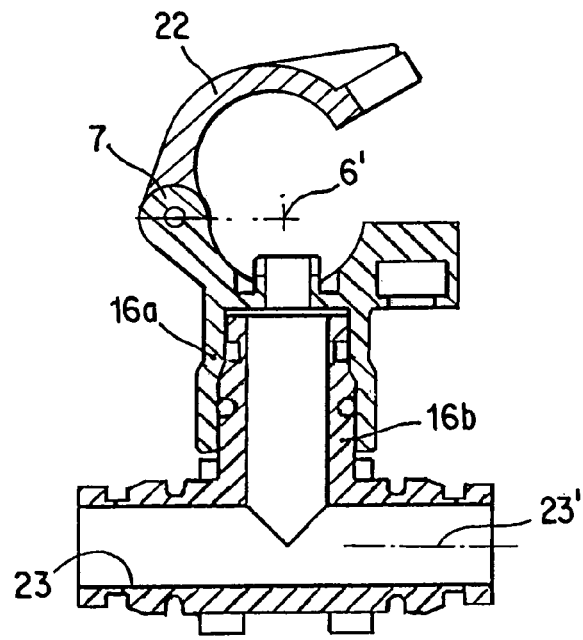
FIG. 9 an illustration of a t-shaped fitting similar to that shown in FIG. 6, but in the form of an embodiment where the fitting and distributor channel are configured in the form of separate components, which will also allow them to be rotated with respect to one another.

FIG. 9 depicts a highly beneficial version of the interconnecting fitting for the distributor channel 23. In this case, the interconnecting fitting consists of two components, namely, the sleeve-shaped extension 16a rigidly connected to the clamping-bail arrangement 7, 22 and the fitting section 16b, which is also a sleeve-shaped extension formed on the distributor channel 23 running transversely thereto and constitutes a single, solid, unit therewith, that is held in place in that sleeve-shaped component.

Figure 10:
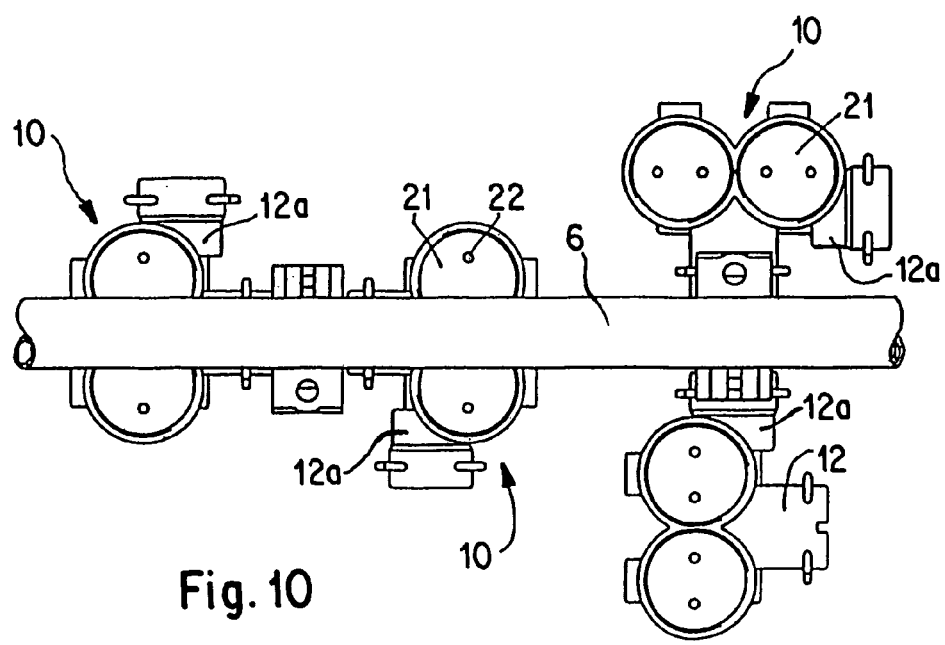
FIG. 10 a top view of a liquid supply line similar to that shown in FIGS. 4 and 5, but having differing arrangements of the dual-sprayer-nozzle units ahead of, and behind, the liquid supply line and two dual-sprayer-nozzle units arranged beneath the liquid supply line that are attached thereto using a fitting like that shown in FIG. 9.

This fitting section 16b may be configured such that it will be held in place in the sleeve-shaped extension 16a at at least two positions separated by 90°. The distributor channel 23 may thus be pivoted from the position shown in FIG. 9, in which its axis 23' is orthogonal to the axis 6' of the liquid supply line, to a position in which its axis 23' is parallel to the axis 6' of the liquid supply line. This configuration of the interconnecting fitting 16a, 16b may be utilized in order to arrive at the alternative arrangement of dual-sprayer-nozzle valve bodies on the liquid supply line 6 shown in FIG. 10. However, a prerequisite therefor is that the distance between the axes 6' and 23' has been chosen large enough that the valve bodies 10 may be pivoted underneath the liquid supply line 6, which will not be possible in the case of the embodiments shown in FIGS. 2 and 8. However, this prerequisite may be met in a simple manner by suitably extending the interconnecting fittings 16a, 16b, in the versions shown in FIG. 9. Provided that the valve bodies 10 have been connected to the distributor channel 23 by means of their coupler sleeves 12, this will, similarly to the arrangement shown in FIG. 4, allow pivoting them either to the position shown at the upper right in FIG. 10, or, if the axis 6' of the liquid supply line and the axis 23' of the distributor channel are oriented parallel to one another, pivoting them to the position beneath the liquid supply 6 shown at the extreme left in FIG. 10. This approach yields beneficial options for arranging sprayer valves that may be implemented in a simple manner, without need for devoting additional time and effort to making modifications to the structures involved. These versions may also be beneficially employed in order to prevent mutual overlappings of sprayer fans.

It is naturally also possible to provide triple-sprayer-nozzle valves or multiple-sprayer-nozzle valves having more than two, instead of just two, sprayer-nozzle valves assigned to a sprayer-nozzle unit, instead of the dual-sprayer-nozzle valves described here. This will provide opportunities for further broadening the variety of arrangements that may be configured.

The invention claimed is:

1. Spraying assembly for spraying liquids, comprising:
    a spray bar arrangement mountable at an agricultural vehicle;
    a liquid supply line, having spaced branches;
    spray nozzle assemblies which each includes at least two spray nozzles which are independently controlled by a spray valve controlled pneumatically or electrically, and a distribution duct connecting the spray valves and having at least two connecting openings which each includes a coupler sleeve, wherein a first coupling sleeve of one of said at least two connecting openings is arranged perpendicular to a second coupling sleeve of another one of said at least two connector openings; and
    fittings connected to the branches of the liquid supply line, each fitting including a T-shaped distributor channel with at least two outlets, each outlet having an interface capable of attaching a spray nozzle assembly; wherein the spray nozzle assemblies are mounted to the fittings and the liquid supply line is mounted to the spray bar arrangement.

2. Spraying assembly according to claim 1, wherein each fitting is detachable from the branch of the liquid supply line and includes a clamping fixture.

3. Spraying assembly according to claim 2, wherein the fitting comprises a nipple to ensure a proper attachment to the branch of the liquid supply line.

4. Spraying assembly according to claim 3, wherein the fitting is rotatably attached to the nipple.

5. Spraying assembly according to claim 4, wherein the fitting is attachable to the nipple in at least two positions separated by 90°.

6. Spraying assembly according to claim 5, wherein the fitting and the nipple are connected by a snap-lock.

7. Spraying assembly according to claim 1, wherein said first coupler sleeve is centered between the spray valves.

8. Spraying assembly according to claim 1, the spray valve including a pneumatically actuatable roller membrane or a pneumatically actuatable piston, and a spring, wherein a preload on the spray valve is applied by the spring.

9. Spraying assembly according to claim 8, wherein the spray valve includes a face surface with a circumferential sealing rim engageable with an O-ring seal included in a valve housing.

10. Spraying assembly according to claim 8, wherein the valve housing includes a bayonet-lock fitting for attaching the spray-nozzle.

11. Spray nozzle assembly according to claim 1, wherein the valve housing includes bayonet-lock fittings for attaching the spray-nozzles.

12. Spray nozzle assembly for spraying liquids, comprising:
a valve housing having at least two valve bores, wherein each valve bore includes a valve outlet;
a distribution duct including a first opening and a second opening and connecting the valve bores, wherein the first and the openings of the distribution duct are arranged perpendicularly to each other;
respective valve bodies located in the respective valve bores, wherein each valve body is controllably movable independently by pneumatic or electric forces; and
spray nozzles connected to the respective valve outlets.

13. Spray nozzle assembly according to claim 12, the distribution duct openings include respective coupler sleeves which are either blockable by a blind plug or are connectable to a fitting.

14. Spray nozzle assembly according to claim 12, wherein one opening is centered between the valve bores.

15. Spray nozzle assembly according to claim 12, the valve body including a pneumatically actuatable roller membrane or a pneumatically actuatable piston, and a spring, wherein a preload on the spray valve is applied by the spring.

16. Spray nozzle assembly according to claim 15, the valve body including a face surface with a circumferential sealing rim, wherein the sealing-rim is engageable with an O-ring seal of the valve housing.

17. Spray-bar arrangement mountable to an agricultural vehicle for spraying liquids, comprising:
a least one liquid supply line;
fittings, connected to the liquid supply line, having spaced branches;
spray nozzle assemblies, comprising:
a valve housing having at least two valve bores, wherein each valve bore includes a valve outlet,
a distribution duct including a first and a second opening, wherein the distribution duct connects the valve bores, and wherein the first and the second openings of the distribution duct are arranged perpendicularly to each other,
at least two valve bodies located in the valve bores, wherein each valve body is controllably movable independently by pneumatic or electric forces, and
spray nozzles, wherein each spray nozzle is connected to a respective one of the valve outlets;
wherein the spray nozzle assemblies are connected to the fittings.

* * * * *